Aug. 12, 1930. W. H. KRUG ET AL 1,772,609
DETACHABLE HORSESHOE CALK
Filed May 6, 1929
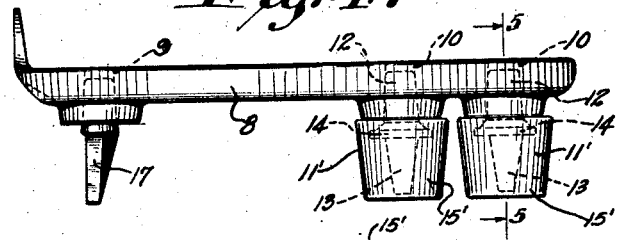
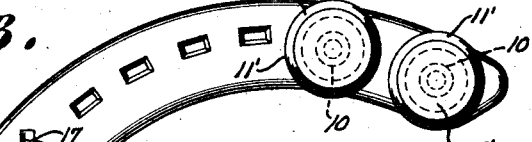
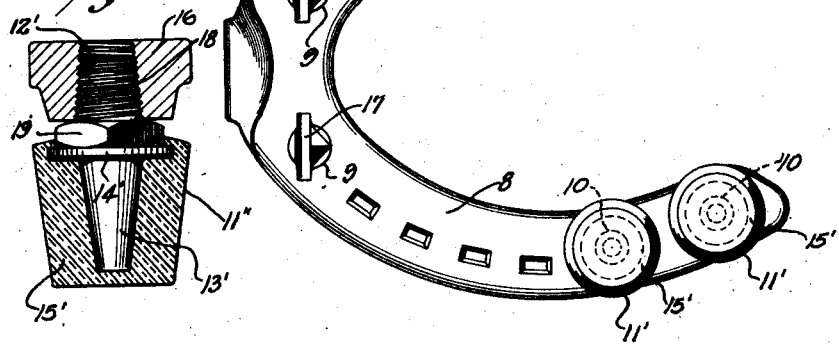
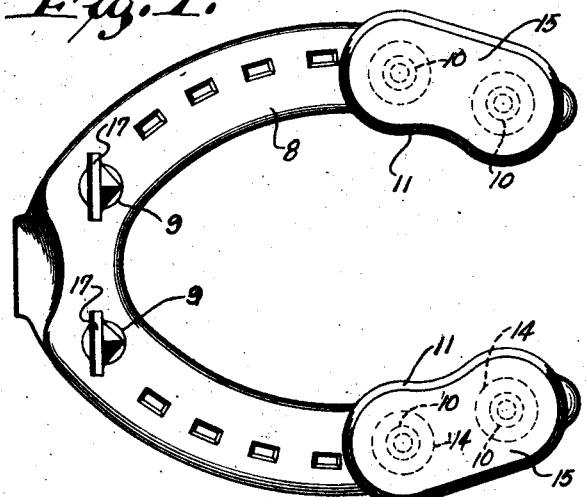
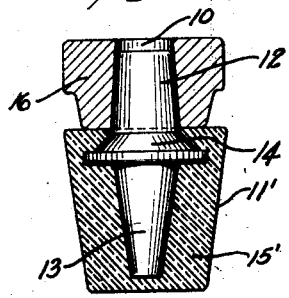
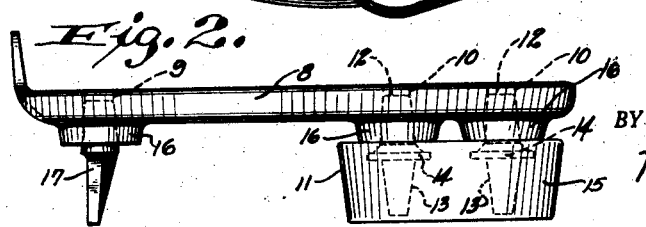
INVENTORS
William H. Krug,
Carl D. Akerberg.
BY
Morsell, Keeney & Morsell
ATTORNEYS Patented Aug. 12, 1930

1,772,609

UNITED STATES PATENT OFFICE

WILLIAM H. KRUG, OF TAYCHEEDA, AND CARL G. AKERBERG, OF OSHKOSH, WISCONSIN, ASSIGNORS TO GIANT GRIP MFG. CO., OF OSHKOSH, WISCONSIN, A CORPORATION OF WISCONSIN

DETACHABLE HORSESHOE CALK

Application filed May 6, 1929. Serial No. 360,824.

This invention relates to improvements in detachable horseshoe calks.

It is one of the objects of the present invention to provide resilient horseshoe calks to prevent slipping, especially adapted for summer use, and which calks are readily detachable without removing the shoe from an animal's hoof.

A further object of the invention is to provide a resilient horseshoe calk of the detachable type which will not work loose from the shoe when in use.

A further object of the invention is to provide a detachable padded horseshoe calk which is of very simple construction, is inexpensive to manufacture, is easily mounted on a horseshoe and removed therefrom for replacement, is strong and durable, and is well adapted for the purposes described.

With the above and other objects in view the invention consists of the improved detachable padded horseshoe calk and its parts and combinations as set forth in the claims, and all equivalents thereof.

In the accompanying drawing in which the same reference characters indicate the same parts in all of the views:

Fig. 1 is an inverted plan view of a horseshoe provided with the improved detachable padded calks;

Fig. 2 is a side view thereof;

Fig. 3 is an inverted plan view of a horseshoe provided with detachable padded calks of a slightly modified form;

Fig. 4 is a side view thereof;

Fig. 5 is an enlarged detail sectional view taken on line 5—5 of Fig. 4; and

Fig. 6 is an enlarged detail sectional view illustrating another modified form of a detachable padded calk.

Referring now more particularly to the drawings, with special reference to the form of the invention illustrated by Figs. 1 and 2, it will appear that the numeral 8 indicates a horseshoe having in its front portion a pair of spaced upwardly, inwardly tapered openings 9, and two pairs of similarly shaped and spaced openings 10 in its rear or heel portion.

The improved padded calks are adapted for detachable insertion in the pairs of openings 10 and also in the pair of openings 9, if desired, but as illustrated, the padded calks are shown only in the openings 10. Each calk member 11 comprises a pair of spaced metallic members having tapered shanks 12, tapered outer stems 13, and medial enlarged flared or anchoring portions 14. The stem and flared portions of a pair of metallic members are embedded in a pad 15 of rubber or other similar resilient material, as shown in Figs. 1 and 2, and said pad is shaped as shown in said figures and underlies a substantial portion of the horseshoe 8.

It will therefore be seen that in the principal form of the invention each padded calk includes an elongated resilient pad with a pair of spaced metallic members embedded therein, and the tapered shanks of said members are driven into pairs of adjacent tapered holes 10 in the horseshoe proper and wedgingly engage therein. As so positioned the top surfaces of the resilient pads 15 engage boss portions 16 depending from the horseshoe adjacent the openings 10.

As shown, a pair of unpadded, somewhat sharpened or tapered metallic calks 17 are embedded in the forward openings 9 of the horseshoe, but if desired said metallic calks 17 may be replaced by one of the double-padded calks shown mounted in the rear portion of the horseshoe.

The improved form of padded calks will not work loose from the horseshoe when in use. As shown in Fig. 2 the tapered stem portions 13 of each calk terminate quite close to the lower outer surface of the pad and hence when the horseshoe is secured onto a horse's hoof in walking there will be a direct pressure applied to the outer ends of the stem, so that at all times, during use, the pressure on said stem portions will force the shank portions of the metallic members into the tapered openings 10. When the improved padded calks become worn and it is desired to replace the same, they may be readily removed from the horseshoe without the necessity of removing the shoe from the animal's hoof. This is accomplished by the application of a tool applied between the upper surface of the calk pad and the under surface of the horseshoe which will cause a withdrawal of the tapered shank portions 12 from the tapered apertures 10.

In Figs. 3, 4 and 5 a slight modification of the invention has been illustrated wherein the padded calks are of single formation, rather than of double formation as in the form of the invention shown in Figs. 1 and 2. Referring particularly to Figs. 3, 4 and 5 it will be seen that each calk includes but one metallic member having a tapered shank portion 12 wedgingly engaged in an aperture 10 and an outer stem 13 and an intermediate flared portion 14, both of which are embedded or molded in a resilient pad 15', of circular form in cross-section. Said single-padded calks are applied as shown, and they also may be employed in the forward openings 9 of the horseshoe in lieu of the metallic calks 17.

A further modification of the invention is illustrated in Fig. 6 wherein the numeral 16 indicates a portion of the horseshoe provided with an upwardly tapered and threaded opening 18. The calk includes a metallic member having a tapered and externally threaded shank 12' and a depending outer stem portion 13'. Between the portions 12' and 13' is an annular enlarged portion 14' and an enlarge angular tool-engaging portion 19. Said metallic portions 13', 14', and a portion of the tool-engaging portion 19 are embedded in a resilient pad member 15', of circular form in cross-section. In use the threaded shank portion 12' of the calk is threaded into the opening 18 of the horseshoe and the angular portion 19 permits the application of a tool for this purpose. To remove the calk for replacement a tool is applied to the portion 19 and the shank portion 12' is unthreaded from the opening.

It will therefore be seen that the present invention contemplates the provision of a padded, resilient horseshoe calk which is readily removable from a horseshoe without the necessity of removing the horseshoe from the animal's hoof. Also, in use the calk is so arranged that the tendency is for it to become firmly engaged by the horseshoe rather than to work loose. The improved detachable padded horseshoe calk is also simple and novel, and is well adapted for the purposes set forth.

What is claimed as the invention is:

1. A padded horseshoe calk, comprising a metallic member having an inner shank portion removably engageable with a horseshoe and an outer stem portion, and a resilient pad member secured onto and completely enclosing said outer stem portion, the outer end portion of said stem terminating inwardly of the bottom of the pad and being covered thereby.

2. A padded horseshoe calk, comprising a metallic member having an inner shank portion removably lodgeable within a horseshoe opening and also having an outer stem portion and an intermediate anchoring portion, and a resilient pad member secured onto and covering said stem and anchoring portions, said stem terminating at its outer end relatively close to the lower surface of said pad so as to be the direct recipient of pressure applied to the lower surface of the pad.

3. A padded horseshoe calk, comprisng an elongated resilient pad adapted to underlie a substantial area of the undersurface of a horseshoe, and a pair of spaced metallic members, each metallic member having an outer stem portion, an intermediate anchoring portion, and an inner tapered shank portion, said stem and anchoring portions of the pair of metallic members being spacedly embedded in said pad with their outer ends terminating relatively close to the lower surface of said pad, the tapered shanks of said metallic members being wedgingly insertable in a pair of tapered horseshoe openings.

4. The combination with a horseshoe having an opening therein, of a removable padded calk, comprising a metallic member having a shank removably inserted in said opening and also having a stem and an intermediate flared anchoring portion, and a resilient pad securely mounted on and enclosing said flared anchoring portion and the stem, a portion of said pad being interposed between the horseshoe and said flared anchoring portion whereby said horseshoe is cushioned.

In testimony whereof, we affix our signatures.

WILLIAM H. KRUG.
CARL G. AKERBERG.